United States Patent [19]
Ward

[11] 3,915,034
[45] Oct. 28, 1975

[54] OVERLOAD PROTECTION SYSTEM FOR MULTI-SPEED MACHINES

[75] Inventor: James E. Ward, Glendora, Calif.

[73] Assignee: Sierra Drilling Equipment Company, Clifton, N.J.

[22] Filed: Oct. 29, 1973

[21] Appl. No.: 410,729

[52] U.S. Cl. .................. 74/740; 74/751; 74/789; 173/163; 184/612; 188/134; 188/264 B; 192/150

[51] Int. Cl.² .................. F16H 37/02; E21C 1/04

[58] Field of Search .............. 74/89, 740, 751, 793; 184/6.12; 81/52.4 A, 52.4 R; 173/163, 146, 12; 192/150; 188/134, 264 B

[56] References Cited
UNITED STATES PATENTS

| | | | |
|---|---|---|---|
| 696,285 | 3/1902 | Vrard et al. | 74/740 |
| 1,912,011 | 5/1933 | Riess et al. | 192/150 |
| 2,152,517 | 3/1939 | Whitney et al. | 74/789 X |
| 2,174,672 | 10/1939 | Von Soden-Fraunhofen | 74/789 X |
| 2,385,630 | 9/1945 | Lear | 74/789 |
| 2,403,094 | 7/1946 | Lear | 74/789 X |
| 2,427,168 | 9/1947 | Thompson et al. | 74/785 |
| 2,810,304 | 10/1957 | Ball | 74/789 |
| 2,918,227 | 12/1959 | Mauborgne | 74/789 X |
| 3,601,515 | 8/1971 | Pelizzoni | 184/6.12 |

*Primary Examiner*—Benjamin W. Wyche
*Assistant Examiner*—John Reep
*Attorney, Agent, or Firm*—Benoit Law Corporation

[57] ABSTRACT

An improved overload protection system for multi-speed machines is described which prevents damage to a primary source of mechanical energy and to the elements coupling such source to a mechanical load when that load exceeds tolerable operating limits for any selected machine speed.

1 Claim, 4 Drawing Figures

OVERLOAD PROTECTION SYSTEM FOR MULTI-SPEED MACHINES

BACKGROUND OF THE INVENTION

1. Field of the Invention

The subject invention relates to multi-speed machines and more specifically to overload protection systems for multi-speed machines.

2. Description of the Prior Art

In using mechanical cutting devices or machines such as drills, coring machines, saws and the like it is not uncommon to strike an unexpected region of abnormal hardness or of material sufficiently different in its characteristics from the surrounding material to cause the cutting tool to be unduly loaded, mechanically, so that it slows significantly, stalls or is broken. In that process the primary source of power and the elements coupling that source to the load may also be damaged or destroyed. To avoid such destruction it has been conventional to utilize a slip clutch set for a given torque level which corresponds to the upper torque limit to be expected in normal operation of the machine at a predetermined speed. Such slip clutches are incorporated in existing systems more or less directly between the primary source of mechanical energy and the mechanical load. Where it is desired that a mechanical speed changer be incorporated in the machine, use of a slip clutch between the speed changer and the load becomes impracticable because, with reduced speeds of the cutting tool it is anticipated that higher torques will be encountered and it is not feasible to adjust the torque level for desired clutch slippage to correspond to each potentially desired machine speed. If the slip clutch is placed between the primary source of mechanical energy and the speed changer the problem of variable operating torque levels at the load is solved but the problem of slip clutch wear is not. Further, the load on the primary source of mechanical energy rises significantly despite the slip-clutch action and, if the source is an electrical motor abnormal electrical current will flow in the motor causing it to overheat, possibly to damage the motor permanently through burning the insulation in the motor's windings and minimally to cause the thermal cut-out switch to operate in the motor, resulting in the inconvenience of having to wait for the motor to cool and then re-setting the cut-out switch.

SUMMARY OF THE INVENTION

It is a general object of this invention to overcome the problems set forth hereinbefore.

It is a more specific object of this invention to provide improved multi-speed machines.

It is a still further object of this invention to provide improved overload protection systems for multi-speed machines.

It is an additional object of this invention to provide improved lubricating means for overload protection systems in multi-speed machines.

It is a still additional object of this invention to provide improved concrete drilling equipment.

Other objects of this invention will become apparent in the further course of this disclosure.

The subject invention resides in apparatus for driving different cutting tools for cutting materials having regions of abnormal hardness exposing cutting tools to overload conditions and breakage, comprising in combination, a drive motor having an output shaft for supplying driving power, means for adapting said driving power to different cutting tools and materials, including changeable speed first gear means having output means for driving any of said tools and having input means, second gear means having input means connected directly to said drive motor output shaft, having first output means connected to said input means of said changeable speed first gear means, and having second output means, and overload responsive brake means connected to said second output means of said second gear means for braking said second output means until occurrence of an overload condition, and for releasing said second output means upon occurrence of an overload condition to safeguard the particular cutting tool and the drive motor against damage.

According to the invention, the subject driving apparatus includes means for immersing at least part of the first gear means in a lubricant, and means extending from the first to the second gear means for supplying lubricant to the brake means.

BRIEF DESCRIPTION OF THE DRAWINGS

FIG. 4 is a front elevational view of the apparatus of FIG. 1, partially in cross section, showing certain details of the speed changing mechanism incorporated in the apparatus of FIG. 1.

DETAILED DESCRIPTION OF THE PREFERRED EMBODIMENT

Figure 1:
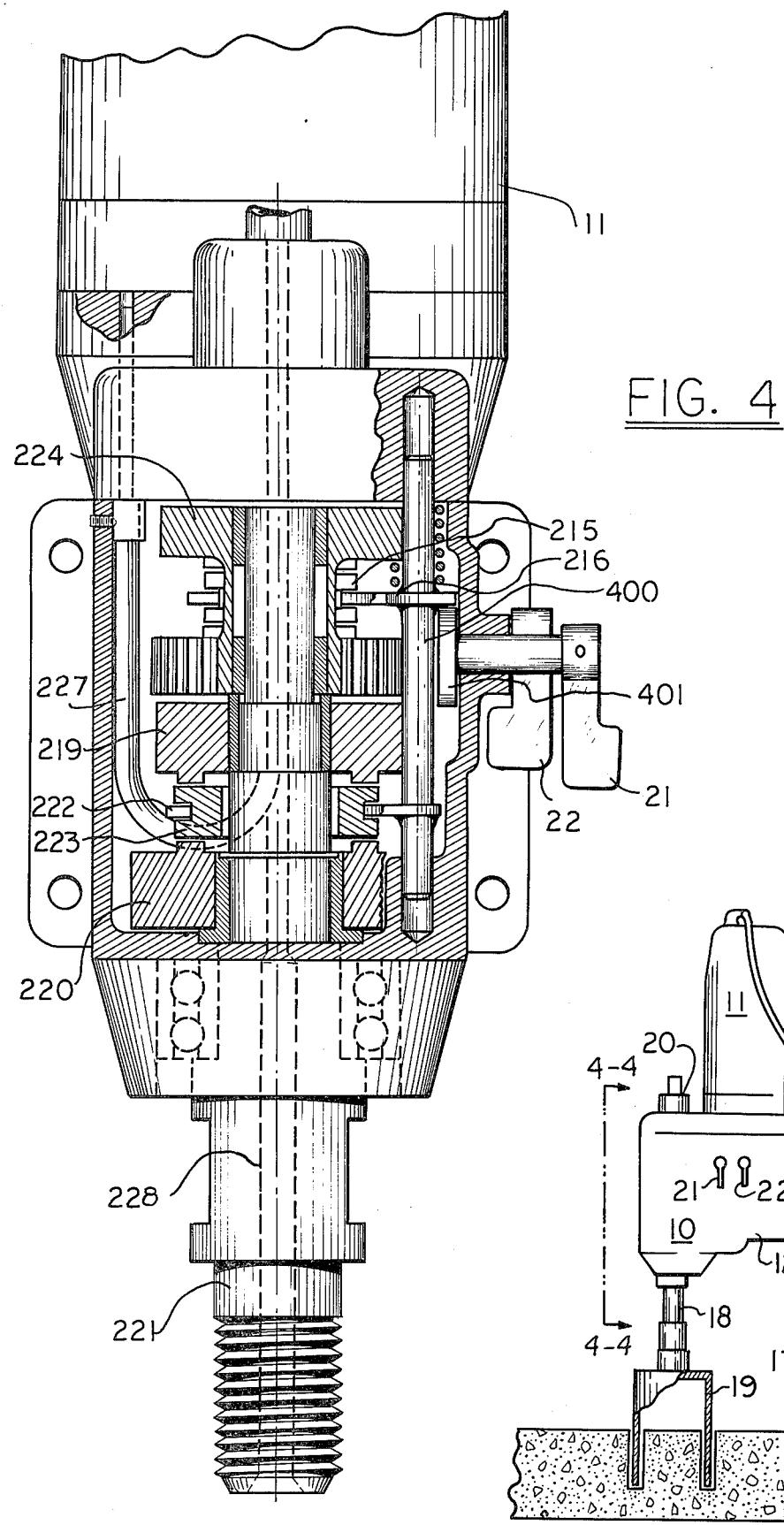
FIG. 1 is a side view in elevation of an assembly incorporating the present invention.

In FIG. 1, cutting machine 10, which for purposes of illustration is a machine designed for cutting holes in concrete, includes electric motor 11 supported and mechanically coupled to housing 12 and controlled by on-off switch 13. Housing 12 is supported by arm 14 which is held in vertically adjustable fashion by column 15. Column 15 is secured to base 16 which, in turn, is secured firmly to the concrete to be cut by appropriate bolts 17. Housing 12 encloses the overload protection system of this invention and the speed changing mechanism both of which are described in detail in connection with FIGS. 2 through 4, and both of which are related to the coupling of mechanical energy from motor 11 to bit drive shaft 18. Drive shaft 18 has affixed thereto bit 19, which normally has a diamond cutting edge. Port 20 permits the inflow of coolant, usually water, to prevent overheating of bit 19 and to carry away residue from the cutting process.

Figure 2:
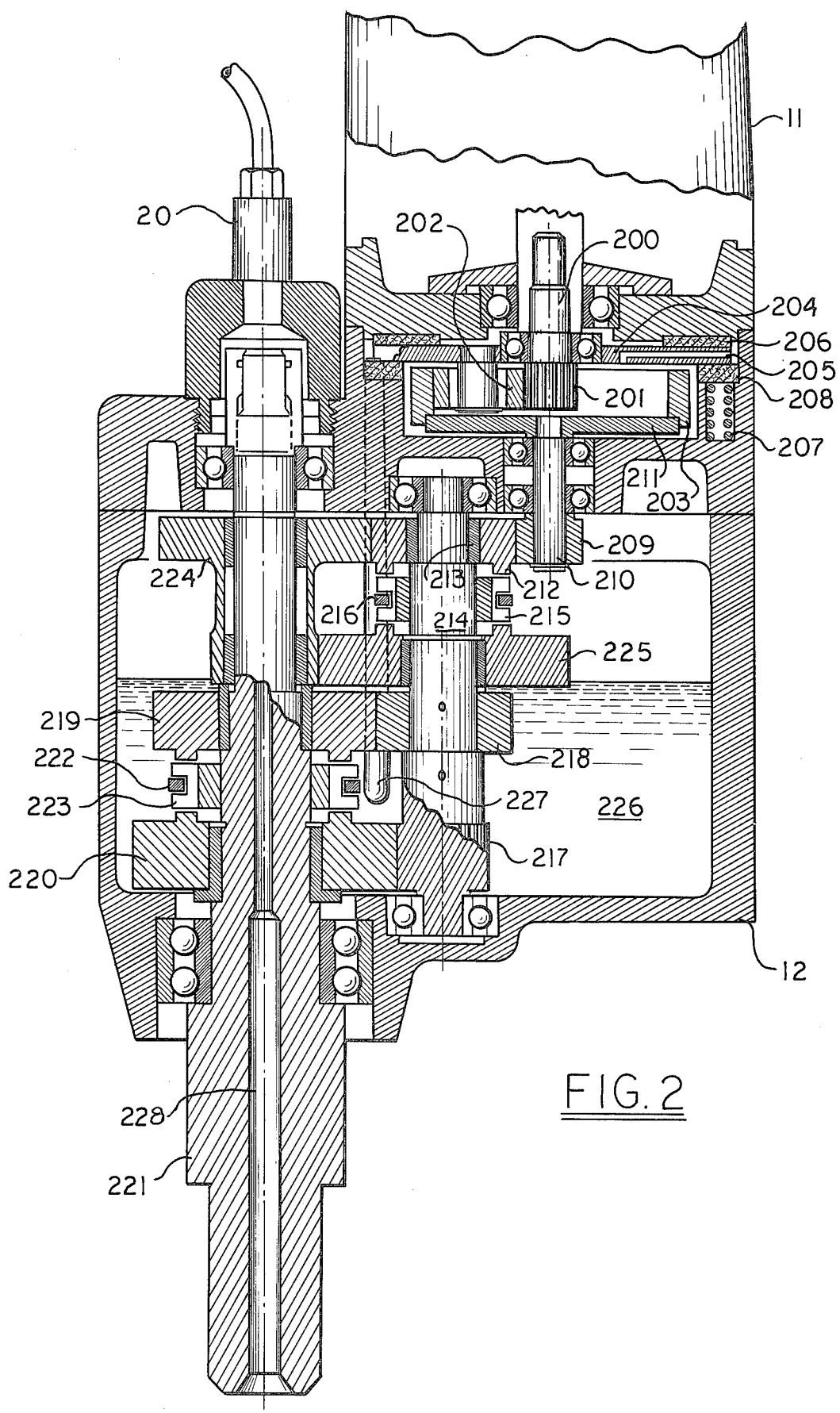
FIG. 2 is a central cross sectional view of the apparatus of FIG. 1 taken in the direction of line 2 — 2 in FIG. 1 and showing the principal elements of this invention.

In FIG. 2, motor 11 is coupled through shaft 200 to drive gear 201 which is pinned or otherwise affixed to shaft 200. Drive gear 201 is the central or "sun" gear of a planetary gear system comprising, in addition to sun gear 201, planet gears 202 and planetary ring gear 203 (all shown more clearly in FIG. 3). First planetary gear plate 204 has lubricating orifice 205 therein to permit the introduction of oil to the various gears making up the planetary gear system. First planetary gear plate 204 is held in firm engagement with fixed first brake ring 206 by means of spring 207 acting through second brake ring 208 and first planetary gear plate 204. First and second brake rings 206 and 208, respectively, may be made of phenolic or other material having good resistance to high temperature and a relatively high coefficient of friction. Materials commonly used in other applications for brake linings or clutch plates may be used here. Rings 206 and 208 are rotationally fixed.

Transmission drive gear 209 is held captive on planetary output shaft 210, which shaft is secured firmly to second planetary gear plate 211 which, in turn, is affixed to planetary ring gear 203 and rotates therewith.

Transmission drive gear 209 engages coupling gear 212 which is mounted so as to be able to turn freely about bearing 213 on shaft 214. Speed changer ring 215 is slot-keyed to shaft 214 so that, while it can move along the axis of shaft 214 any rotation of ring 215 will force a rotation of shaft 214. Rotation of ring 215 occurs when yoke 216 is adjusted to a "high" or "low" speed position by an appropriate setting of lever 21 in FIG. 1. When lever 21 moves ring 215 upwardly in FIG. 2, shaft 214 is driven by gear 212 at a first speed. Because gears 217 and 218 are captive on shaft 214 they rotate with it. However, it is to be noted that gear 218 is of greater diameter than gear 217. Therefore gear 219 which is coupled to gear 218 is caused to rotate at a higher speed than gear 220 which is coupled to gear 217. Normally gears 219 and 220 rotate freely on bit drive shaft 221.

However, when, as a result of adjusting speed control lever 22 in FIG. 1 yoke 222 moves speed changer ring 223 (which is mounted on shaft 221 as ring 215 is mounted on shaft 214) into engagement with either gear 219 or 220, bit drive shaft 221 is caused to rotate, relatively slowly, if gear 220 is engaged and more rapidly if gear 219 is engaged.

Adjustment of lever 21 to move ring 215 downwardly in FIG. 2, results in shaft 214 being driven through gears 209, 212, 224 and 225 and a speed reduction results at bit shaft 221.

Housing 12 is sealed so as to permit carrying a reservoir of oil 226 which lubricates the speed changer mechanism directly and lubricates the planetary gear system through lubricating tube 227 and orifice 205. Oil is forced through tube 227 by the pumping action of gears 218 and 219 which are immersed in the oil in reservoir 226.

Bit drive shaft 221 has passage 228 therethrough which cooperates with port 20 to permit passage of a coolant into the cutting area. This coolant also flushes debris out of the cutting area.

Figure 3:
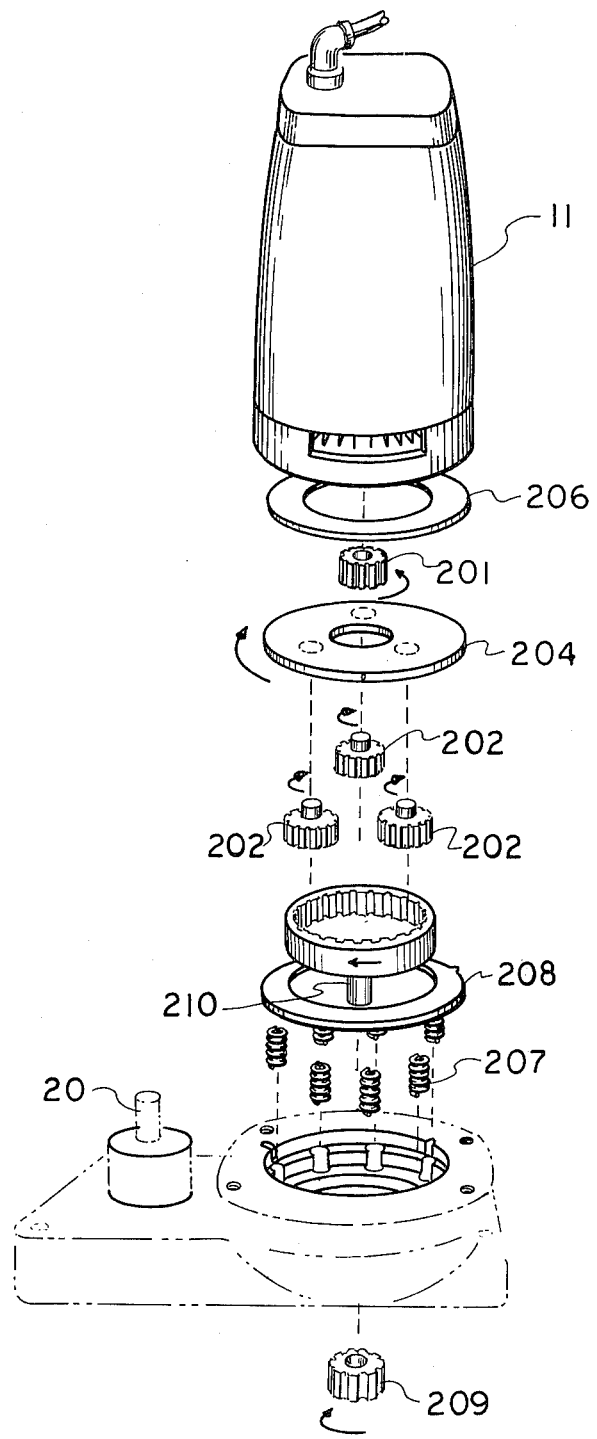
FIG. 3 is an exploded view of the overload protection portion of the apparatus of FIG. 1.

FIG. 3 requires little description beyond that which has been given in connection with FIG. 2. Corresponding parts have been given corresponding reference numbers. The number of gears, springs and clutch rings and their relative positions appear more clearly in this exploded view and any ambiguity as to the construction of this vital part of this invention should be removed.

It may be more apparent that if gear 209, which drives the speed changer and, ultimately, the bit drive shaft, is prevented from rotating (meaning that bit 19 has been stalled) instead of breaking bit 19 or any part of the speed changer, or damaging the rest of the mechanism or the motor in any way, slippage will occur at the interfaces between brake rings 206 and 208, on the one hand, and the faces of first planetary gear plate 204 in contact with the respective brake rings. Actual experience with a working model according to this invention has shown that if the machine is cutting concrete, for example, and hits an iron pipe, or the like, with a resultant stalling of the bit drive shaft the input current to the electric motor 11 instead of rising to dangerous levels, as would be expected in such a circumstance, remains at substantially the same current as prevailed before the foreign object was struck by the bit. For example, in one case the motor was drawing 22 amperes when stalling of the bit drive shaft 21 occurred. The current input to the motor remained at 22 amperes. The overload protective system according to this invention prevented both mechanical and electrical damage.

In FIG. 4 some additional details of the speed changing mechanism can be seen, for example the relationship between levers 21 and 22 and their yokes 216 and 222 respectively. A biasing spring 400 is shown urging yoke 216 into firm contact with extension 401 of lever 21. Extension 401 may be shaped as a simple cam to cause speed changing ring 215 to move upward in response to a first positioning of lever 21 and to move downward in response to a second positioning of lever 21, causing a change in the speed of bit drive shaft 221, for the reasons set forth in connection with the discussion of FIG. 2.

While a particular embodiment has been described, modifications may be made within the scope of the invention. The following claims are intended to cover such embodiments.

What is claimed is:

1. Apparatus for driving different cutting tools for cutting materials having regions of abnormal hardness exposing cutting tools to overload conditions and breakage, comprising in combination:

a drive motor having an output shaft for supplying driving power;

means for adapting said driving power to different cutting tools and materials, including changeable speed first gear means having output means for driving any of said tools and having input means;

means for immersing at least part of said first gear means in a lubricant;

second gear means having input means connected directly to said drive motor output shaft, having first output means connected to said input means of said changeable speed first gear means, and having second output means;

overload responsive brake means connected to said second output means of said second gear means for braking said second output means until occurrence of an overload condition, and for releasing said second output means upon occurrence of an overload condition to safeguard the particular cutting tool and the drive motor against damage; and means extending from said first to said second gear means for supplying lubricant to said brake means.

* * * * *